United States Patent
Millward et al.

(10) Patent No.: US 9,890,436 B2
(45) Date of Patent: Feb. 13, 2018

(54) STAINLESS STEEL STRIP FOR FLAPPER VALVES

(71) Applicant: voestalpine Precision Strip AB, Munkfors (SE)

(72) Inventors: Chris Millward, Forshaga (SE); Azhar Nawaz, Forshaga (SE); Alexander Lof, Karlstad (SE)

(73) Assignee: VOESTALPINE PRECISION STRIP AB, Munkfors (SE)

( * ) Notice: Subject to any disclaimer, the term of this patent is extended or adjusted under 35 U.S.C. 154(b) by 0 days.

(21) Appl. No.: 15/102,217

(22) PCT Filed: Dec. 8, 2015

(86) PCT No.: PCT/SE2015/051316
§ 371 (c)(1),
(2) Date: Jun. 6, 2016

(87) PCT Pub. No.: WO2016/093762
PCT Pub. Date: Jun. 16, 2016

(65) Prior Publication Data
US 2017/0335419 A1    Nov. 23, 2017

(30) Foreign Application Priority Data

Dec. 9, 2014 (EP) .................................... 14196949
Aug. 25, 2015 (SE) .................................... 1551093

(51) Int. Cl.
*C21D 1/25* (2006.01)
*C21D 9/02* (2006.01)
(Continued)

(52) U.S. Cl.
CPC ................ *C21D 1/25* (2013.01); *C21D 9/02* (2013.01); *F16F 1/02* (2013.01); *C21D 1/607* (2013.01);
(Continued)

(58) Field of Classification Search
CPC .................................................... C21D 8/0205
See application file for complete search history.

(56) References Cited

U.S. PATENT DOCUMENTS 5,714,114 A * 2/1998 Uehara .................. C22C 38/20
148/325
2009/0301615 A1  12/2009 Montagnon

FOREIGN PATENT DOCUMENTS

CN        1145644 A       3/1997
CN      102337461 A       2/2012
(Continued)

OTHER PUBLICATIONS

Extended European Search Report dated Jul. 28, 2015, for European Patent Application No. 14196949.3.
(Continued)

*Primary Examiner* — Roy King
*Assistant Examiner* — Jophy S Koshy
(74) *Attorney, Agent, or Firm* — Karceski IP Law, PLLC

(57) ABSTRACT

A cold rolled and hardened martensitic austenitic stainless steel strip for flapper valves in compressors is made from steel combining, in weight %(wt. %), the following elements: C: 0.3-0.5, Si: 0.2-0.8, Mn: 0.2-1.0, Cr: 12.0-15.0, Mo: 0.50-2.00, N: 0.02-0.15, and V: 0.01-0.20. The steel strip has a matrix consisting of tempered martensite and between 5 and 15 volume % austenite and a tensile strength ($R_m$) of 1970-2300 MPa. The steel strip has a thickness of 0.07-3 mm and a width of ≤500 mm.

12 Claims, 1 Drawing Sheet

Tensile Properties Vs Austenitising Temperature in continuous hardening furnace.

(51) Int. Cl.
*F16F 1/02* (2006.01)
*C22C 38/00* (2006.01)
*C22C 38/02* (2006.01)
*C22C 38/04* (2006.01)
*C22C 38/44* (2006.01)
*C22C 38/46* (2006.01)
*C21D 1/607* (2006.01)

(52) U.S. Cl.
CPC .. *C21D 2211/001* (2013.01); *C21D 2211/008* (2013.01); *C22C 38/001* (2013.01); *C22C 38/02* (2013.01); *C22C 38/04* (2013.01); *C22C 38/44* (2013.01); *C22C 38/46* (2013.01)

(56) References Cited

FOREIGN PATENT DOCUMENTS

| | | | |
|---|---|---|---|
| CN | 103614649 A | * | 3/2014 |
| EP | 1739199 A1 | | 1/2007 |
| GB | 1223150 | | 2/1971 |
| JP | H10275737 A | | 11/1989 |
| JP | H0448050 A | | 2/1992 |
| JP | H0533244 A | | 2/1993 |
| JP | H09256116 A | | 9/1997 |
| JP | H1018001 A | | 1/1998 |
| JP | H1018002 A | | 1/1998 |
| JP | H10110248 A | | 4/1998 |
| JP | 2001271144 A | | 10/2001 |
| JP | 2009203528 A | | 10/2009 |

OTHER PUBLICATIONS

European Office Action dated Aug. 8, 2016, for European Patent Application No. 14196949.3.
Chinese Office Action dated Feb. 4, 2017, for Chinese Patent Application No. 201580003829.X.
International Search Report and Written Opinion dated Feb. 17, 2016, for International Patent Application No. PCT/SE2015/051316.

* cited by examiner

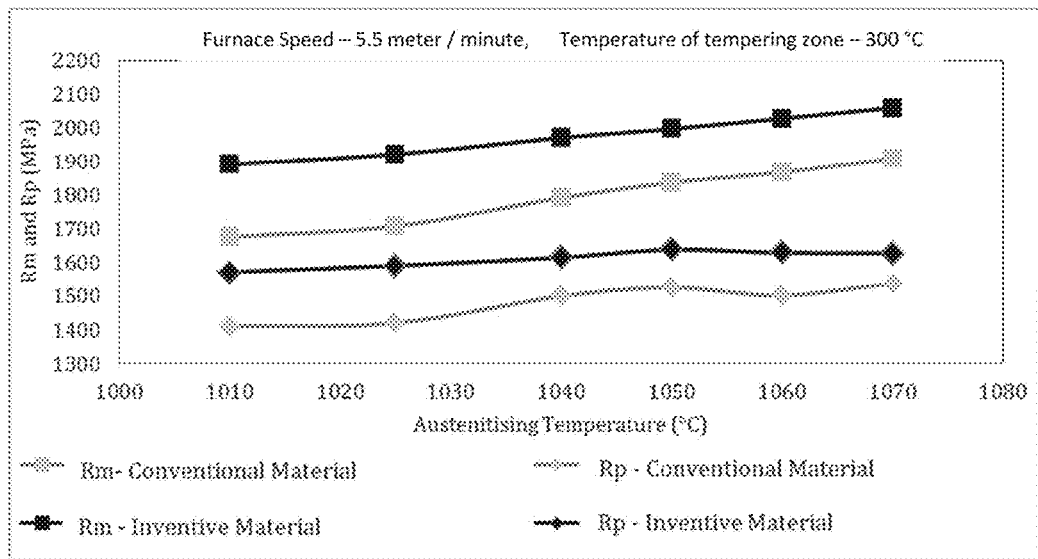
Fig. 1. Tensile Properties Vs Austenitising Temperature in continuous hardening furnace.
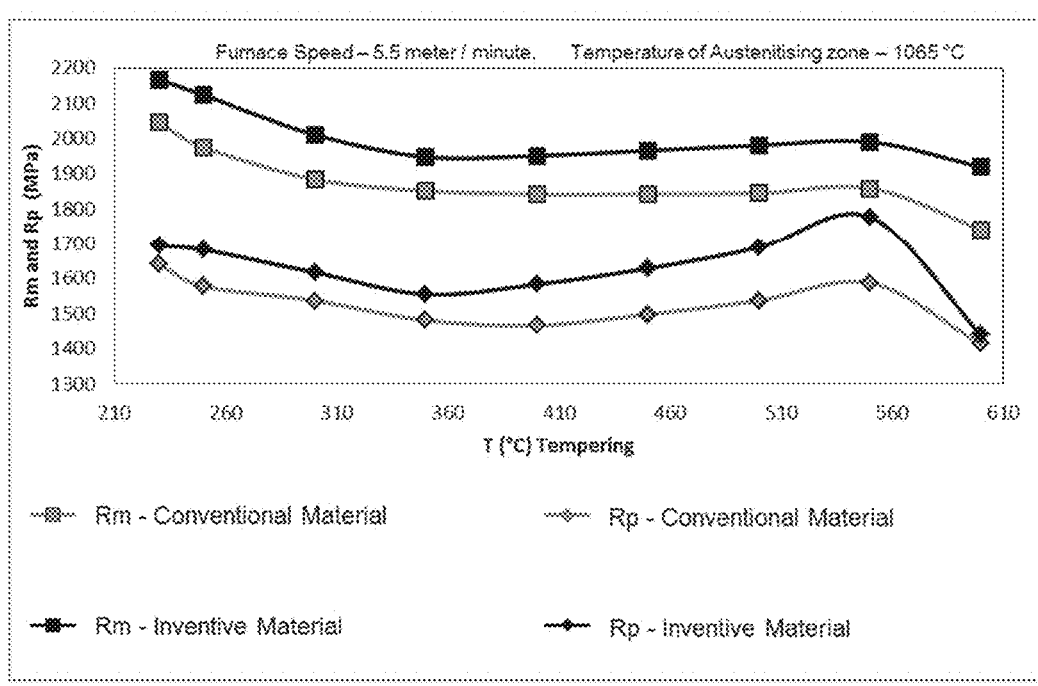
Fig. 2 Tensile Properties Vs Tempering Temperatures in continuous hardening furnace

STAINLESS STEEL STRIP FOR FLAPPER VALVES

CROSS-REFERENCE TO RELATED APPLICATION(S)

This is a National Stage Entry into the United States Patent and Trademark Office from International PCT Patent Application No. PCT/SE2015/051316, having an international filing date of Dec. 8, 2015, and which claims priority to both European Patent Application No. EP 14196949.3, filed Dec. 9, 2014, and to Swedish Patent Application No. SE 1551093-6, filed Aug. 25, 2015, the entire contents of all of which are incorporated herein by reference.

FIELD OF THE INVENTION

The invention relates to a stainless steel strip for flapper valves in compressors and other reed applications.

BACKGROUND OF THE INVENTION

Flapper or reed valves are used in various types of applications where a specific type of compression cycle is regulated for a specific purpose. It can be a refrigeration cycle in a hermetic reciprocating compressor working uninterrupted in a refrigerator or in the air conditioner of a car. A flapper valve is basically a spring made from a pre-hardened steel strip. In its simplest form, the flapper valve is tongue shaped, where one end is fixed and the opposite end hangs free and regulates the liquid or gas flow in the compressor. The flapper valve suffers from both cyclic bending stresses and cyclic impact stresses during its service. Usually, these cyclic stresses eventually cause fatigue failure. Accordingly, the fatigue properties are of the utmost importance for the flapper valve material.

A flapper valve made of a steel strip of this invention has its fatigue properties optimized by a combined effect of modifications to the chemical composition of the steel, the non-metallic inclusions and the heat treatment.

Compressor OEMs require materials that have a higher fatigue life to improve the compressor's performance and life.

Furthermore, there is a growing interest in the industry to develop more energy efficient and quieter compressors. The coefficient of performance (COP) can be increased by increasing the valve lift and by reducing the thickness of the valves. Compressor designers therefore require valve materials that have enhanced damping properties in addition to fatigue strength improvement.

The existing steel grades used for reed valves are modified versions of a carbon steel AISI 1095 and a stainless steel AISI 420 produced via conventional melting, casting, rolling and heat treatment processes. However, the industry demands and resulting performance requirements mean that future flapper reeds will increasingly need to be made out of very thin steel strip with an increased fatigue life expectancy and higher damping properties.

SUMMARY OF THE INVENTION

The general object of the present invention is to provide a pre-hardened stainless steel strip for flapper valves having an optimized property profile such that it can be used to produce more efficient and reliable compressors.

A further object is to provide pre-hardened stainless steel strip for flapper valves, which reduces the flapper reed contribution to the overall noise levels of the compressor.

It is also an object of the present invention to provide a method of producing such an improved steel strip.

The foregoing objects, as well as additional advantages are achieved to a significant measure by providing a cold rolled and hardened martensitic stainless steel strip having a composition, microstructure and physical properties as set out in the claims.

The invention is defined in the claims.

BRIEF DESCRIPTION OF THE DRAWINGS

The present invention will now be described in connection with the drawings filed herewith, in which:

FIG. 1 is a graph plotting tensile strength ($R_m$) and yield strength ($R_p$) versus austenitising temperature (°C); and FIG. 2 is a graph plotting tensile strength ($R_m$) and yield strength ($R_p$) versus tempering temperature (°C).

DETAILED DESCRIPTION

The importance of the separate elements and their interaction with each other as well as the limitations of the chemical ingredients of the claimed alloy are briefly explained in the following. All percentages for the chemical composition of the steel are given in weight % (wt. %) throughout the description. The amount of microstructural phases is given in volume % (vol. %). Upper and lower limits of the individual elements can be freely combined within the limits set out in the claims.

Carbon (0.3-0.5%)

is to be present in a minimum content of 0.3%, preferably at least 0.32, 0.34, 0.36 or 0.36%. Carbon is a strong austenite stabilizer with relatively large solubility in austenite. The upper limit for carbon is 0.5% and may be set to 0.48, 0.46, 0.44 or 0.42%. A referred range is 0.35-0.41%. In any case, the amount of carbon should be controlled such that the amount of primary carbides of the type $M_{23}C_6$, $M_7C_3$ and $M_6C$ in the steel is limited, preferably the steel is free from such primary carbides.

Silicon (0.2-0.8%)

Silicon is used for deoxidation. Si is a strong ferrite former and increases the carbon activity. Si is also a powerful solid-solution strengthening element and strengthens the steel matrix. This effect appears at a content of 0.2% Si. A preferred range is 0.30-0.60%.

Manganese (0.2-1.0%)

Manganese is an austenite stabilizer and contributes to improving the hardenability of the steel. Manganese shall therefore be present in a minimum content of 0.2%, preferably at least 0.3, 0.35 or 0.4%. When the content of Mn is too large the amount of retained austenite after finish annealing may be too high. The steel shall therefore contain maximum 1.0% Mn, preferably maximum 0.8, 0.7 or 0.65%.

Chromium (12.0-15.0%)

Chromium is a ferrite stabilizing element, which is added to impart corrosion resistance to the steel. Cr needs to be present in a content of at least 12.0% in order to provide a passive film on the steel surface. The lower limit may be 12, 4, 12, 6, 12, 8 or 13%. When the content of Cr exceeds 15%, however, delta ferrite may form.

Molybdenum (0.5-2.0%)

Mo is a ferrite stabilizer and is known to have a very favourable effect on the hardenability. Molybdenum is essential for attaining a good secondary hardening response.

The minimum content is 0.5% and may be set to 0.6, 0.7 or 0.8%. Molybdenum is strong carbide forming element and also a strong ferrite former. The maximum content of molybdenum is therefore 2.0%. Preferably Mo is limited to 1.5, 1.83 or 1.1%.

Vanadium (0.01-0.20%)

Vanadium forms evenly distributed fine precipitated carbides, nitrides and carbonitrides of the type V(N,C) in the matrix of the steel. This hard phase may also be denoted MX, wherein M is mainly V but other metals like Cr and Mo may be present to some extent. X is one or both of C and N. Vanadium shall therefore be present in an amount of 0.01-0.2%. The upper limit may be set to 0.1 or 0.08%. The lower limit may be 0.02, 0.03, 0.04 or 0.05%.

Nitrogen (0.02-0.15%)

Nitrogen is a strong austenite former. N is restricted to 0.15% in order to obtain the desired type and amount of hard phases, in particular V(C,N). Higher nitrogen content may lead to work hardening, edge cracking and/or a high amount of retained austenite. When the nitrogen content is properly balanced against the vanadium content, vanadium rich carbonitrides V(C,N) will form. These will be partly dissolved during the austenitizing step and then precipitated during the tempering step as particles of nanometre size. The thermal stability of vanadium carbonitrides is considered to be better than that of vanadium carbides. Therefore the resistance against grain growth at high austenitizing temperatures is enhanced. The lower limit may be 0.02, 0.03, 0.04 or 0.05%. The upper limit may be 0.12, 0.10, 0.08 or 0.06%.

Nickel (≤2.0%)

Nickel is an austenite former. Ni may be present in an amount of ≤2.0%. It gives the steel a good hardenability and toughness. However, because of the expense, the nickel content of the steel should be limited. The upper limit may therefore be set to 1.0, 0.5 or 0.5%. However, Ni is normally not deliberately added.

Cobalt (≤2.0%)

Cobalt is an austenite former. Co causes the solidus temperature to increase and therefore provides an opportunity to raises the hardening temperature. During austenitization it is therefore possible to dissolve larger fraction of carbides and thereby enhance the hardenability. Co also increases the Ms temperature. However, large amount of Co may result in a decreased toughness and wear resistance. The maximum amount is 2% and may be set to 0.5%. However, for practical reasons, such as scrap handling, a deliberate addition of Co is normally not made.

Copper (≤2.0%)

Cu is an austenite stabilizing element but has a low solubility in ferrite. Cu may contribute to increasing the hardness and the corrosion resistance of the steel. However, it is not possible to extract copper from the steel once it has been added. This drastically makes the scrap handling more difficult. For this reason, the upper limit may be 1.0, 0.5, or 0.3%. Copper is normally not deliberately added.

Aluminium (≤0.06%)

Aluminium may be used for deoxidation in combination with Si and Mn. The lower limit is set to 0.001, 0.003, 0.005 or 0.007% in order to ensure a good deoxidation. The upper limit is restricted to 0.06% for avoiding precipitation of undesired phases such as AlN and hard, brittle Alumina inclusions. The upper limit may be 0.05, 0.04, 0.03, 0.02 or 0.015%.

Tungsten (≤2%)

In principle, molybdenum may be replaced by twice as much with tungsten because of their chemical similarities. However, tungsten is expensive and it also complicates the handling of scrap metal. The maximum amount is therefore limited to 2%, preferably 0.5% or 0.3% and most preferably no deliberate additions are made.

Niobium (≤0.05%)

Niobium is similar to vanadium in that it forms carbonitrides of the type M(N,C) and may in principle be used to replace part of the vanadium but that requires the double amount of niobium as compared to vanadium. However, Nb results in a more angular shape of the M(N,C) and these are also much more stable than V(C,N) and may therefore not be dissolved during austenitising. The maximum amount is therefore 0.05%, preferably 0.01% and most preferably no deliberate additions are made.

Ti, Zr and Ta (≤0.05% each)

These elements are carbide formers and may be present in the alloy in the claimed ranges for altering the composition of the hard phases. However, normally none of these elements are added.

Boron (≤0.01%)

B may be used in order to further increase the hardness of the steel. The amount is limited to 0.01%, preferably ≤0.005 or even ≤0.001%.

Ca and REM (Rare Earth Metals)

These elements may be added to the steel in the claimed amounts in order to further improve the hot workability and to modify the shape of non-metallic inclusions.

Impurity Elements

P, S and O are the main impurities, which have a negative effect on the mechanical properties of the steel strip. P may therefore be limited to 0.03%, preferably to 0.01%. S may be limited to 0.03, 0.01, 0.008, 0.0005 or 0.0002%. O may be limited to 0.003, 0.002 or 0.001%.

The present inventors have systematically investigated the effect of a modified chemical composition and a modified heat treatment on the mechanical properties of the flapper valve material. The modifications made to the chemical composition relative to the conventional material were mainly focused on increases in nitrogen and vanadium although some benefits were also gained from increases in austenite levels and tighter control over such elements as carbon, manganese and phosphorus.

The continuous hardening of valve strip was undertaken using different furnace parameters to map the hardening response of material from the conventional and modified chemical compositions. The production trials were carried out at a constant line speed with hardening temperatures in the range from 1000° C. to 1080° C., quenching into a molten lead alloy at a temperature in the range of 250° C. to 350° C. and tempering at temperatures in the range from 220° C. to 600° C.

The mechanical properties resulting from these hardening trials on conventional material corresponded to:

a yield strength $Rp_{0.2}$ range between 1300 MPa and 1600 MPa.

a tensile strength Rm range between 1740 MPa and 2100 MPa an elongation A50 range between 4% and 6%

Further continuous hardening trials were carried out on material with the modified chemical composition and non-metallic inclusion content. The production trials were carried out at a constant line speed with hardening temperatures in the range from 1050° C. to 1100° C., quenching into a molten lead alloy at a temperature in the range of 250° C. to 350° C. and tempering at temperatures in the range from 220° C. to 600° C.

The mechanical properties resulting from further hardening trials on material with the modified chemical composition and non-metallic inclusion content corresponded to:
- a $Rp_{0.2}$ range between 1400 MPa and 1750 MPa,
- a Rm range between 1970 MPa and 2300 MPa
- a A50 range between 4% and 8%

As detailed herein, the present invention is directed to a cold rolled and hardened martensitic austenitic stainless steel strip for flapper valves in compressors. The steel strip has a composition consisting of, in weight % : C 0.3-0.5; Si 0.2-0.8; Mn 0.2-1.0; Cr 12.0-15.0; Mo 0.5-2.0; N 0.02-0.15; V 0.01-0.20; Ni≤2.0; Co≤2.0; Cu≤2.0; W≤2.0; Al≤0.06; Ti≤0.05; Zr <0.05; Nb≤0.05; Ta≤0.05; B≤0.01; Ca≤0.009; REM≤0.2; Fe and impurities balance. The steel strip has a matrix consisting of tempered martensite and between 5 and 15 volume % austenite, a tensile strength ($R_m$) of 1970-2300 MPa, and a thickness of 0.07-3 mm and a width of ≤500 mm.

In other variations, the composition may fulfill at least one of the following requirements: C 0.35-0.41; Si 0.30-0.60; Mn 0.40-0.65; Cr 13-14; Mo 0.8-1.2; N 0.03-0.13; V 0.02-0.10; Ni≤0.5; Co≤0.5; Cu≤0.5; W≤0.5; Al≤0.01; Ti≤0.01; Zr≤0.01; Nb≤0.01; Ta≤0.01; B≤0.001; and Ca 0.0005-0.002, and wherein the impurity contents of P, S and O fulfils the following requirement P≤0.03; S≤0.03; O≤0.003. In yet another embodiment, the composition fulfils the following requirements: C 0.35-0.41; Si 0.30-0.60; Mn 0.40-0.65; Cr 13-14; Mo 0.8-1.2; N 0.03-0.10; and V 0.03-0.09.

The strip also is contemplated to fulfill at least one of the following requirements: a tensile strength ($R_m$) of 2000-2200 MPa; a yield strength ($R_{P0.2}$) of 1500-1750 MPa; a Vickers Hardness (HV1) of 570-650; and a ductility A50 of 4-9%. In addition, the strip may fulfill the following requirement: a reverse bending fatigue is greater than 850 MPa. The strip may have a thickness of 0.1-1.5 mm and/or a width of 5-150 mm. The strip also may have a maximum globular inclusion size of 6 μm. Still further, the strip may have a primary inclusion species of Silicate type with a maximum width of 4 μm.

The steel strip having the composition described above is contemplated to undergo the following process. The composition is hot rolled to produce a hot rolled strip. Then, the hot rolled strip is cold rolled to produce a cold rolled strip having a thickness of 0.07-3 mm. Next, the cold rolled strip is continuously hardened and tempered. Finally, the cold rolled strip may be optionally slitted.

It is contemplated that, during the continuous hardening and tempering of the cold rolled strip, an austenitizing temperature between 1000 to 1150° C. will be employed, and a tempering temperature is contemplated to be 200-600° C. Optionally Additionally, the hardening of the cold rolled strip is contemplated to include quenching in a bath of molten lead and/or lead alloy, where the bath is held at a temperature of 250-350° C.

The steel may be produced using powder metallurgy. The steel strip that is produced is contemplated to have a maximum globular inclusion size of 6 μm, as noted above.

EXAMPLE

In this example a stainless steel strip according to the invention is compared to a conventional stainless steel strip. The composition of the investigated steels was as follows:

|    | Conventional | Inventive |
|----|--------------|-----------|
| C  | 0.38         | 0.40      |
| Si | 0.36         | 0.42      |
| Mn | 0.48         | 0.56      |
| Cr | 13.1         | 13.4      |
| Mo | 0.98         | 0.99      |
| N  | 0.017        | 0.052     |
| V  | 0.009        | 0.055     |
| Ni | 0.31         | 0.15      |
| P  | 0.018        | 0.018     |
| S  | 0.0004       | 0.0006    |

Fe and Impurities Balance.

The cold rolled strips used for the hardening and tempering trials all had a thickness of 0.203 mm and a width of 140 mm. The strips were subjected to hardening and tempering in the above mentioned continuous hardening furnace. Tensile strength measurements were made according to ISO 6892:2009. FIG.1 discloses tensile properties as a function of the austenitising temperature. FIG.2 discloses the tensile properties as a function of the tempering temperature.

INDUSTRIAL APPLICABILITY

The inventive steel strip can be used for producing flapper valves for compressors having improved properties.

The invention claimed is:

1. A cold rolled and hardened martensitic and austenitic stainless steel strip for flapper valves in the compressors, wherein the steel strip
   a) has a composition consisting of, in weight %:
   C 0.3-0.5
   Si 0.2-0.8
   Mn 0.2-1.0
   Cr 12.0-15.0
   Mo 0.5-2.0
   N 0.02-0.15
   V 0.01-0.20
   Ni≤2.0
   Co≤2.0
   Cu≤2.0
   W≤2.0
   Al≤0.06
   Ti≤0.05
   Zr≤0.05
   Nb≤0.05
   Ta≤0.05
   B≤0.01
   Ca≤0.009
   REM≤0.2
   Fe and impurities balance,
   b) has a matrix consisting of tempered martensite and between 5 and 15 volume % austenite,
   c) has a tensile strength ($R_m$) of 1970-2300 MPa, and
   d) has a thickness of 0.07-3 mm and a width of ≤500 mm.

2. A strip according to claim 1, wherein the composition fulfills at least one of the following requirements:
   C 0.35-0.41
   Si 0.30-0.60
   Mn 0.40-0.65
   Cr 13-14
   Mo 0.8-1.2
   N 0.03-0.13
   V 0.02-0.10
   Ni≤0.5
   Co≤0.5

Cu≤0.5
W≤0.5
Al≤0.01
Ti≤0.01
Zr≤0.01
Nb≤0.01
Ta≤0.01
B≤0.001 and
Ca 0.0005-0.002.

3. A strip according to claim 1, wherein the composition fulfills the following requirements:
C 0.35-0.41
Si 0.30-0.60
Mn 0.40-0.65
Cr 13-14
Mo 0.8-1.2
N 0.03-0.10 and
V 0.03-0.09.

4. A strip according to claim 1, fulfilling at least one of the following requirements:
a tensile strength ($R_m$) of 2000-2200 MPa,
a yield strength ($R_{P0.2}$) of 1500-1750 MPa,
a Vickers Hardness (HV1) of 570-650, and
a ductility A50 of 4-9%.

5. A strip according to claim 1, fulfilling the following requirement:
a reverse bending fatigue greater than 850 MPa.

6. A strip according to claim 1, wherein the strip has a thickness of 0.1-1.5 mm and/or a width of 5-150 mm.

7. A strip according to claim 1, wherein the strip has a maximum globular inclusion size is 6 μm.

8. A strip according to claim 1, wherein the has a primary inclusion species of Silicate type with a maximum width of 4 μm.

9. A method of producing a strip according to claim 1, comprising:
a) hot rolling the composition of claim 1 to produce a hot rolled strip,
b) cold rolling the hot rolled strip to produce a cold rolled strip having a thickness of 0.07-3 mm,
c) continuously hardening and tempering the cold rolled strip, and
d) optionally, slitting the cold rolled strip.

10. A method according claim 9, wherein:
in step c) an austenitizing temperature is 1000-1150° C., and
a tempering temperature is 200-600° C.

11. A method according claim 9, wherein:
the hardening involves quenching the strip in a bath of molten lead and/or lead alloy, and
the bath is held at a temperature of 250-350° C.

12. A method according to claim 9, further comprising:
producing the steel strip by powder metallurgy,
wherein a maximum globular inclusion size in the cold rolled strip is 6 μm.

* * * * *